United States Patent [19]
Fukushima et al.

[11] Patent Number: 5,751,135
[45] Date of Patent: May 12, 1998

[54] CHARGING CONNECTOR FOR ELECTRIC VEHICLE

[75] Inventors: Hirotaka Fukushima; Toshiaki Hasegawa, both of Shizuoka, Japan

[73] Assignee: Yazaki Corporation, Tokyo, Japan

[21] Appl. No.: 753,497

[22] Filed: Nov. 26, 1996

[30] Foreign Application Priority Data

Nov. 30, 1995 [JP] Japan .................................. 7-312937

[51] Int. Cl.$^6$ ...................................................... H01R 13/62
[52] U.S. Cl. .......................................... 320/107; 439/476.1
[58] Field of Search .......................... 320/2, 107; 439/34, 439/152, 476.1, 488, 489, 490; 362/800

[56] References Cited

U.S. PATENT DOCUMENTS

| | | | |
|---|---|---|---|
| 5,350,312 | 9/1994 | Kuno et al. | 439/310 |
| 5,458,496 | 10/1995 | Itou et al. | 439/34 |
| 5,536,173 | 7/1996 | Fujitani et al. | 439/34 |
| 5,564,819 | 10/1996 | Yamaguchi | 362/241 |

FOREIGN PATENT DOCUMENTS 6-290836  10/1994  Japan .
7-65900   3/1995   Japan .

Primary Examiner—Peter S. Wong
Assistant Examiner—Gregory J. Toatley, Jr.
Attorney, Agent, or Firm—Armstrong, Westerman, Hattori, McLeland & Naughton

[57] ABSTRACT

In a charging connector device for an electric vehicle composed of a power supplying connector and a power receiving connector, an indicator lamp of a two color type is set in an illumination chamber within a case body of the power supplying connector. One color of the two colors is used for illumination. The power supplying connector includes a locking lever and a microswitch. When both connectors are provisionally coupled with each other, a securing piece at the one end of the locking lever runs over a securing protrusion of the power receiving connector so that the pressing potion at the other end of the locking lever presses a switch spring of the microswitch to be turned off, thereby giving rise to no energization of the charging connector device. When both connectors are completely coupled with each other, the lever is elastically restored by the action of a coil spring, thus energizing the connector device.

5 Claims, 14 Drawing Sheets

CHARGING CONNECTOR FOR ELECTRIC VEHICLE

BACKGROUND OF THE INVENTION

1. Field of the Invention

The present invention relates to a charging connector device for an electric vehicle, and more particularly to a charging connector device which has an illumination means mounted to a connector itself and can make locking and turn-on of electricity easily and in safety.

2. Description of the Prior Art

Generally, an electric connector device composed of a pair of opposite female and male connectors coupled with each other is not provided with an illumination means. A charging connector device used for charging, however, requires charging in the night or dark in many cases. J-UM-A-6-290836 proposes a power supplying connector a for promoting connection and disconnection in the night as shown in FIGS. 12 and 13. In this power supplying connector, as seen from the figures, a grip 72 mounted on the rear end of a connector body 71 has a space 74 whose upper surface protrudes from the connector body 71. The space accommodates a light bulb 75, a battery cell 76 and a sliding switch 77. In operation, the light bulb 75 is lit so as to shine over the front of a window 73.

In order to make charging in safety while holding the complete coupling state of a connector on a vehicle side and another connector on a power supply side, JP-A-7-65900 proposes a charging connector as shown in FIGS. 14 to 16. This charging connector device includes a connector b on a vehicle side and a connector c on the power supply side. A connector housing 81 of the vehicle side connector b incorporates a charging terminal 82 and a signal terminal 83. A cap 84 allowing free opening/closing is provided so as to face the opening of the front end b.

The connector housing 85 of the power supply side c includes terminals 82' and 83' corresponding to the charging terminal 82 and the signal terminal 83 and is elastically provided with a coil spring 86 for urging the connector c in a returning direction. A cap 84' is mounted on the opening end of the connector c. A body 87 coupled with the rear end of the connector housing 85 is provided with a stay or a brace 89 which moves by a grip 88 and a lever 90. The connector c includes a first locking means (not shown) for holding both connectors at a provisional securing position when the connector on the power supply side is inserted against the coil spring 86 and a second locking means consisting of the stay 89 and a member (not shown) engaged therewith when both connectors are completely coupled with each other.

The above grip shaft 88 is provided with a locking plate 91 for locking a lever 90 and a sliding switch 92 for turning on or off a contact 96 of a microswitch 95 within the body 87. The sliding switch 92 slide among three positions of "on", "off" and "return", and is engaged with the contact 96 through a sliding body 93 and a pressing plate 94 which move in linkage with the movement of the sliding switch 92. Incidentally, reference numerals 97 and 97' denote coil springs for urging the locking plate 91 and the sliding body 93 forward.

The turn-on of electricity or energization of the charging connector is carried out as follows. After both connectors are completely coupled with each other by the first and second locking means, the sliding switch 92 is slid to the position of "on" by two-dot chain line in FIG. 15 to lock the lever 90 by the lock plate 91 and to push the contact 96 of the microswitch 95 by the pressing plate 94 so that the energization of the charging circuit inclusive of the charging terminal 82, signal terminal 83, etc. is carried out. Upon completion of the charging, the sliding switch 92 is once moved backward to the position of "return" as shown in FIG. 16 to release the locking of the lever 90 by the locking plate 91 and is thereafter returned to the position of "off" indicated by solid line in FIG. 15. When both connectors b and c are not completely coupled with each other, as shown in FIG. 16, the locking plate 91 and sliding switch 92 are not moved forward because of the presence of the first stopper 90a and the second stopper 90b of the lever 90 and hence the contact 96 of the microswitch 95 is not closed so that the charging circuit is not energized.

Meanwhile, mounting of the illumination device as shown in FIGS. 12 and 13 on the connector device increases the number of components such as the light bulb 75 and the battery 76, thus increasing the mounting space, production cost and the size of the connector device.

The provision of the double-locking means and on-off mechanism such as shown in FIGS. 14 to 16 is accompanied by many operations. Specifically, the coupling and separation between the connector b on the vehicle side and the connector c on the power supply side are carried out. First, the provisional coupling between the connector c and connector b is first made and thereafter the complete coupling is made gripping the lever 90. The slide switch 92 is moved to the position of "on" to perform the charging. After the charging, the slide switch 92 is moved to the position of "off" and thereafter to the position of lock releasing ("return"). Finally, the connector c is pulled out from the connector b. In this way, the procedure is complicate and difficult to understand for general users, thus leading to a cause of malfunction. In addition, the slide switch 92 can be turned on or off during both coupling and separation so that safety of charging is not assured.

SUMMARY OF THE INVENTION

An object of the present invention is to provide a charging connector device for an electric vehicle, equipped with an illumination means which can be made in a small size and at low cost.

Another object of the present invention is to provide a charging connector device for an electric vehicle in which coupling, locking, electricity turn-on and separation between a connector on a power receiving side and another connector on a power supply side can be carried out substantially simultaneously by a single operation easily and in safety.

In order to attain the above objects, in accordance with a first aspect of the present invention, there is provided a charging connector device for an electric vehicle comprising a power supplying connector and a power receiving connector, said power supplying connector comprising an indicator lamp set in an illumination chamber, said indicator lamp including two LEDs which emit two different colors during standby when said power supplying connector is connected to a charger and during charging, respectively, wherein when said power supplying connector and said power receiving connector are completely coupled with each other, the connector device is energized.

In such a structure, the indicator lamp can also be used in such a manner that the first emitted color is used for illumination during standby and the second emitted color is used for indication of charging. Therefore, the connector device can be made in a small space at low cost.

In accordance with another aspect of the present invention, there is provided a charging connector for an electric vehicle according to comprising a power supplying connector and a power receiving connector, said power supplying connector comprising:

a microswitch having a contact so as to allow energization of the charging connector device; and a locking lever having a securing piece at its first end and a pressing portion at its second end opposite to said first end, and an intermediate portion between both first and second end being axially supported, said pressing portion to be engaged with the switch spring of said microswitch, and said power receiving connector comprises a securing protrusion engaged with said securing piece when both connectors are completely coupled with each other, wherein when said power supplying connector and said power receiving connector are completely coupled with each other, the connector device is energized. In this aspect, the power supply connector preferably further comprises means for urging said locking lever for locking and releasing engagement between said pressing portion of the locking lever and said switch spring of the microswitch. In such a structure, when both connectors are provisionally coupled with each other, the connector device is not energized because of engagement of the pressing portion of the locking lever and the microswitch, and when both connectors are completely coupled with other, the connector device is energized. Thus, the operation for complete coupling and switching operation of energization can be performed simultaneously. The separation of both connectors can be easily performed by pressing the pressing portion of the locking lever to release the locking of both connectors and pulling out the power supplying connector.

The above and other objects and features of the present invention will be more apparent from the following description taken in conjunction with the accompanying drawings.

BRIEF DESCRIPTION OF THE DRAWINGS

FIG. 6A is an enlarged view of the area circled in FIG. 6;

DESCRIPTION OF THE PREFERRED EMBODIMENTS

Figure 1:
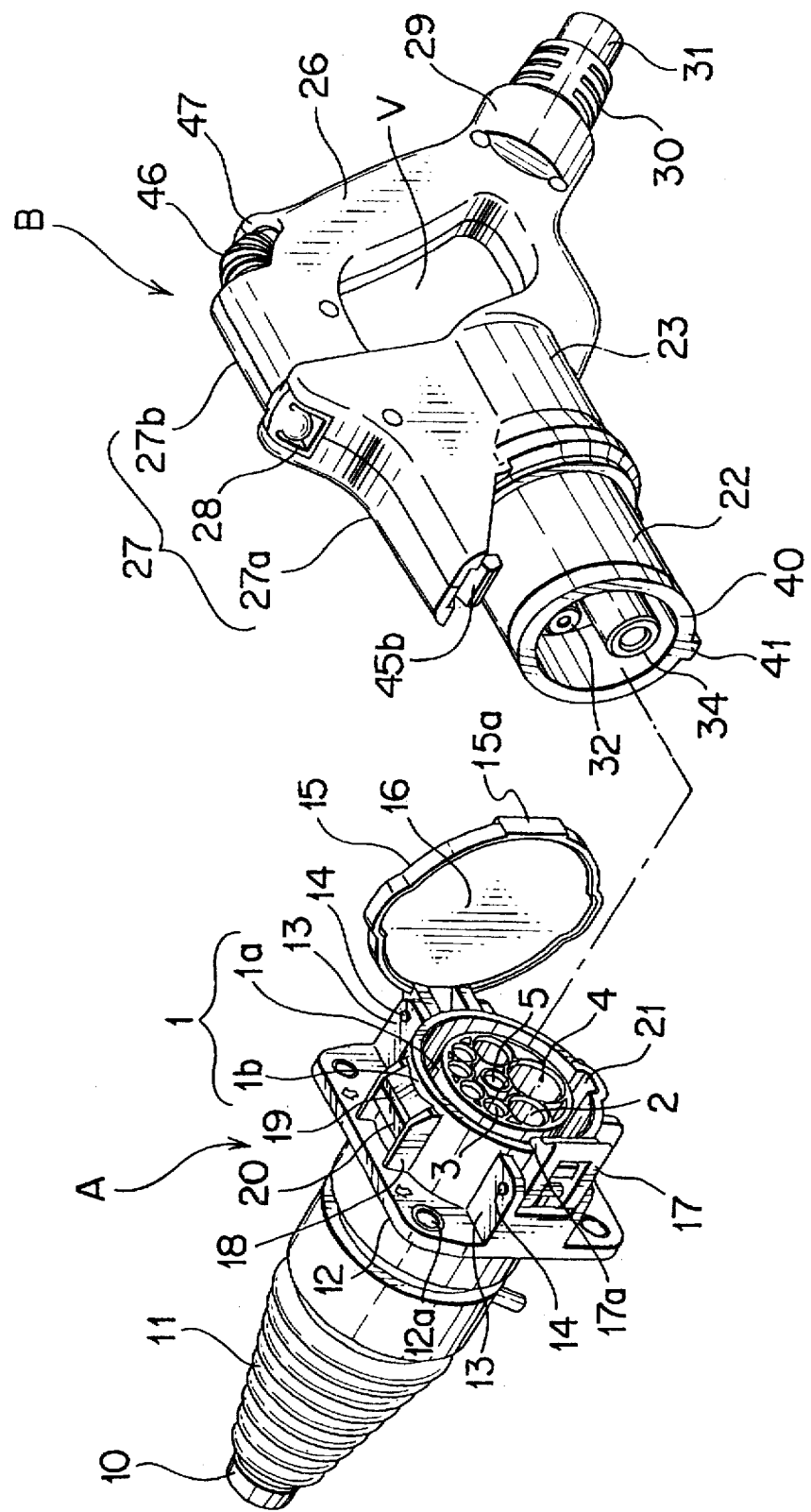
FIG. 1 is a perspective view of the first embodiment of a charging connector according to the present invention in a state where a power receiving connector and a power supply connector are separated.

Now referring to the drawings, an explanation will be given of embodiments of the present invention.

Figure 2:
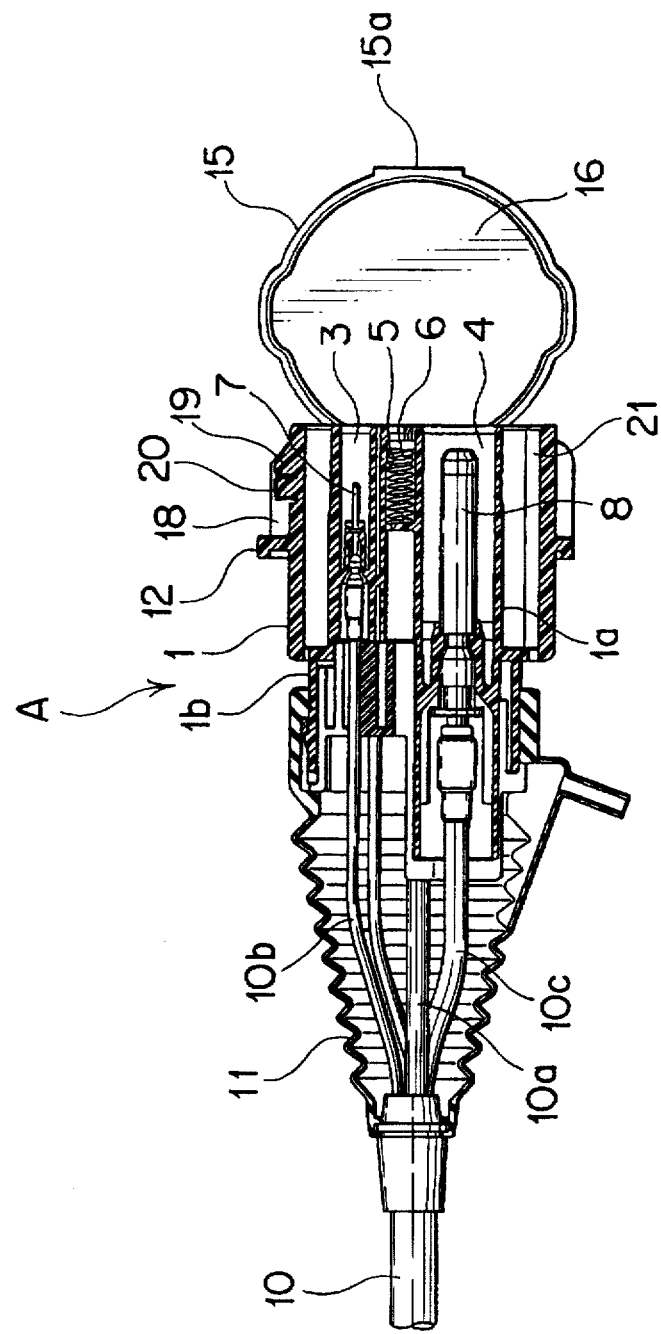
FIG. 2 is a longitudinal sectional view of the receiving connector in FIG. 1.
Figure 3:
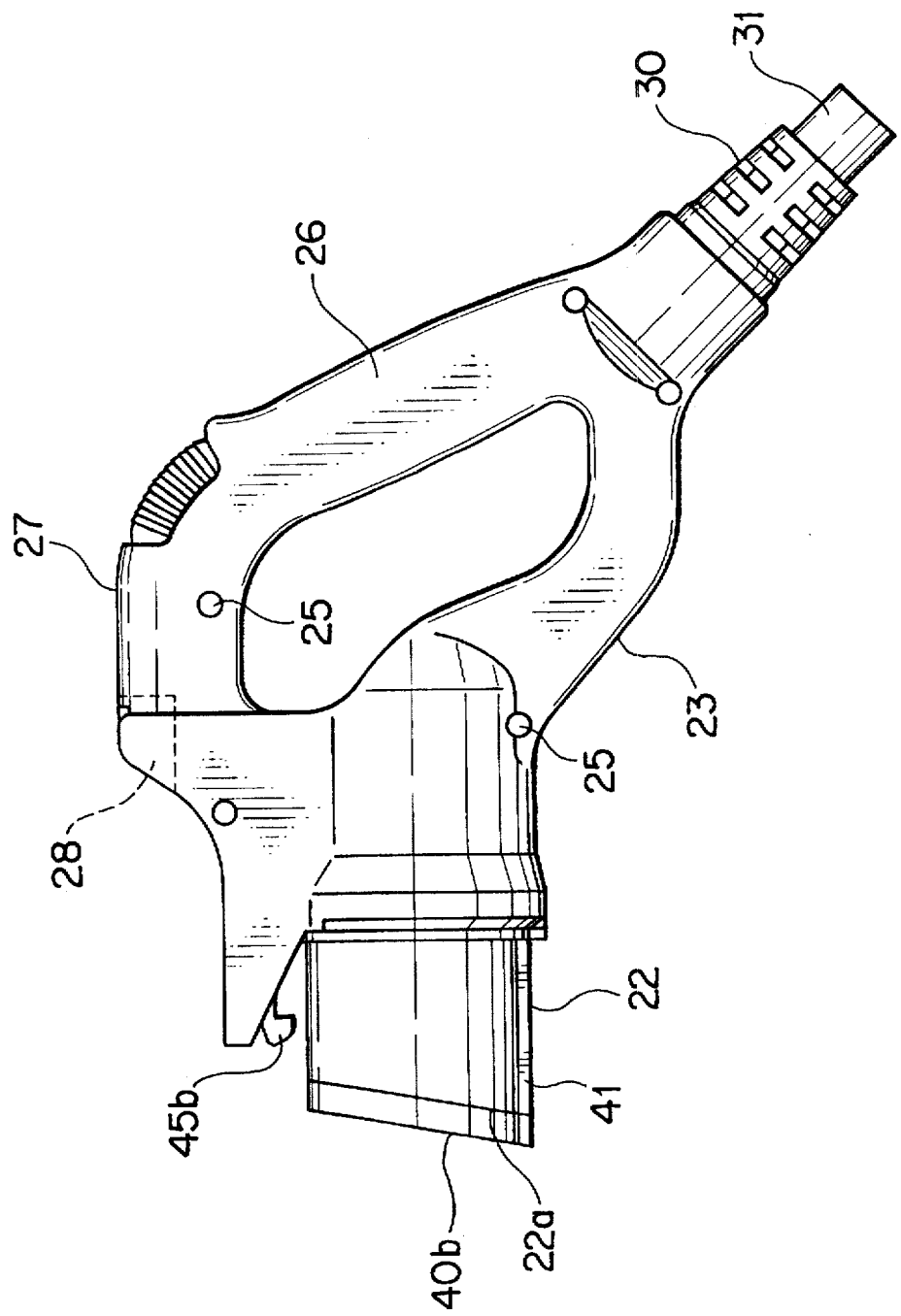
FIG. 3 is a front view of the power supply connector in FIG. 1.
Figure 4:
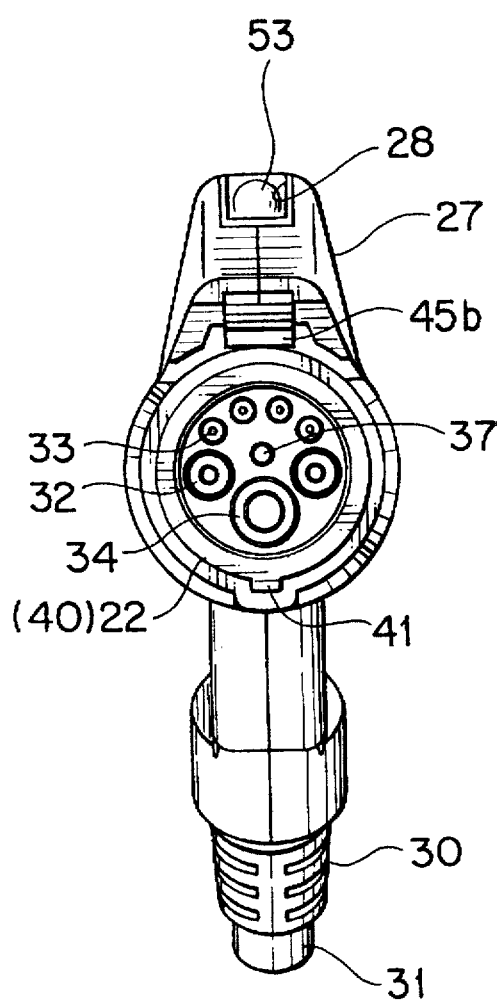
FIG. 4 is a left side view of FIG. 3.
Figure 5:
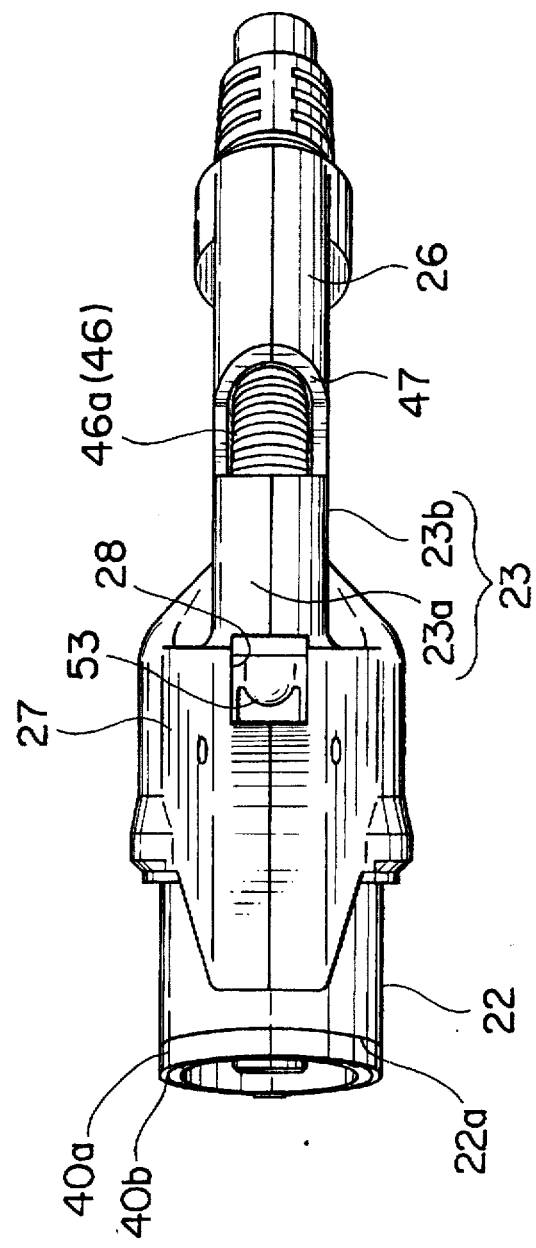
FIG. 5 is a plan view of FIG. 3.
Figure 6:
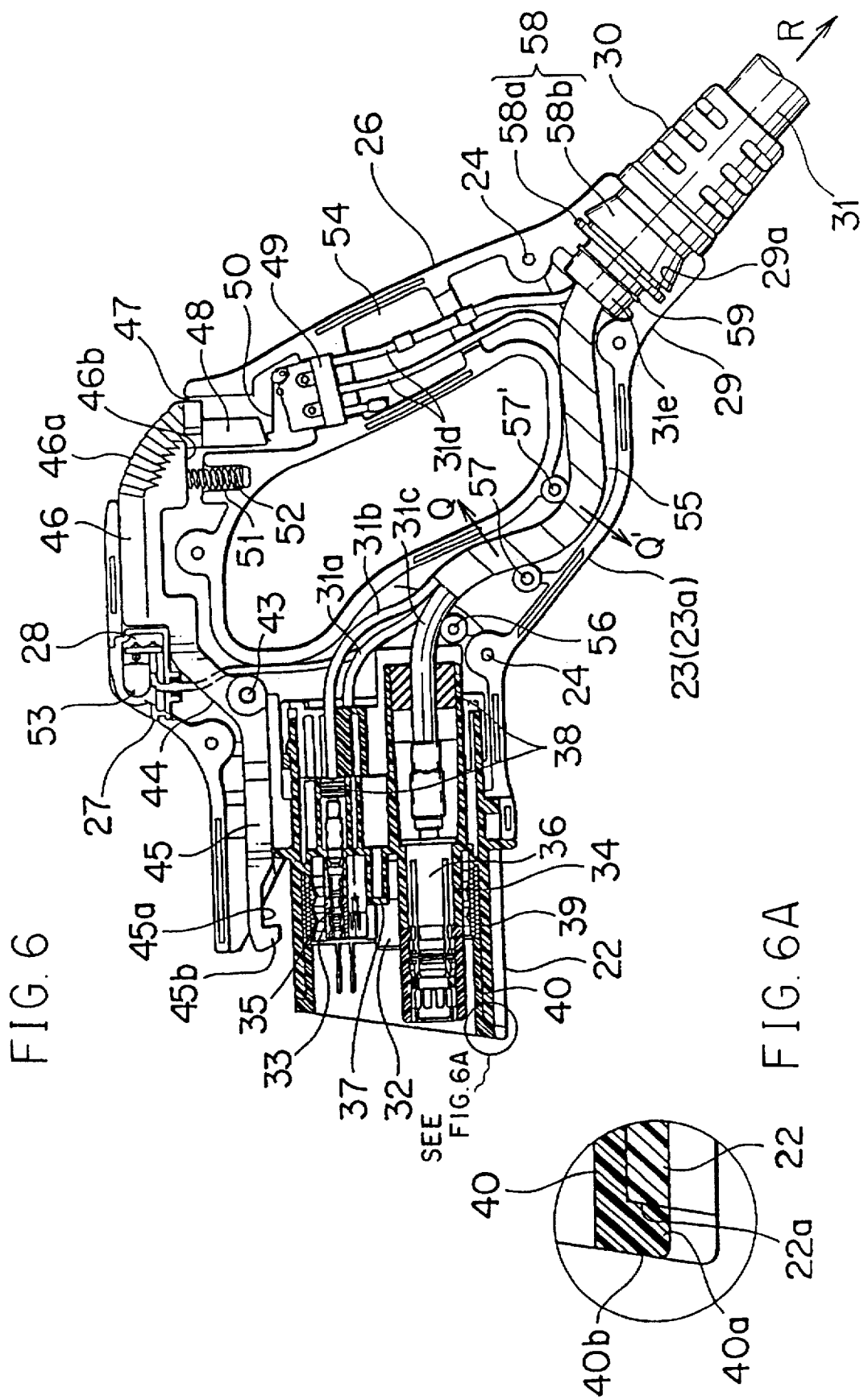
FIG. 6 is a longitudinal sectional view of the power supply connector of FIG. 1
Figure 7:
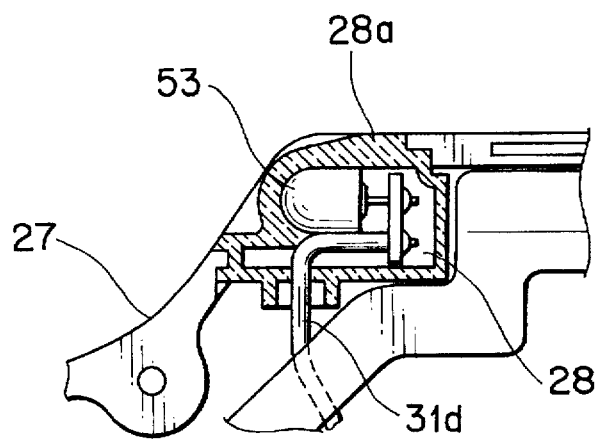
FIG. 7 is an enlarged view of an indicator in FIG. 6.

In FIGS. 1 and 2, element A denotes a power receiving connector attached to a vehicle body and element B denotes a power supply connector.

In the power receiving connector A, a housing 1 is made of a synthetic resin insulating material, and is formed in a double-cylinder structure composed of an inner cylindrical housing 1a and an outer cylindrical housing 1b. Inside the inner housing 1a, plural terminal chambers 2, 3 and 4 which are cylindrical and have different diameters are located individually. At a central area, a spring chamber 5 incorporating a returning spring 6 is located. The returning spring 6 urges the power supply connector B towards a returning direction to promote separation of the connectors in removal. In the terminal chambers 2, 3 and 4, a charging male terminal (not shown) connected to a battery, a signal male terminal 7 for display and control of a charging state, and a grounding male terminal 8 are inserted, respectively. The respective male terminals are connected to lead wires 10a, 10b and 10c of a cable 10 and extracted through a grommet 11 covered on the rear end of the outer housing 1b. The charging male terminal, which has the same structure as that of the ground male terminal and is only slightly smaller than it, is not shown. A flange 12 having bolt holes 12a is protruded from the outer intermediate portion of the outer housing 1b, and is secured to the vehicle body. On both sides of front of the flange 12, a pair of brackets 13 are uprighted intervening the front half of the outer housing 1b. The one bracket is provided with a cap 15 which is openable/closeable by a pin shaft 14, and the other bracket is provided with a locking piece 17 which is rotatable by another pin shaft 14. The cap 15 is provided with a receiving seat 15a to be engaged with an engagement piece 17a at the tip of the locking piece 17, and also equipped with a sealing packing 16 on its inner face. This permits dust proofing or water proofing during non-use. At the front half of the outer housing 1b, a securing piece 19 sandwiched between a pair of protection guide walls 18 and having a sloped front is provided on its upper side, and a metallic enforcement piece 20 for preventing abrasion is fit at the rear of the securing piece 19. On the lower side of the outer housing 1b, a guide groove 21 corresponding to a guide strip 41 of the power supply connector B is made in a coupling direction.

In FIG. 1 and FIGS. 3 to 6, a case body 23 is coupled with the rear end of a connector housing 22 made of synthetic resin insulator of the power supply connector B. The case body 23 is composed of a pair of division type cases 23a and 23b which are tightened by nuts 25 passing through screw passing holes 24 formed at their collating edges. The case body 23 is coupled with a grip 26 through a space V at its rear, with a locking lever chamber 27 having an illumination chamber 28 at its upper side and with a cable connection portion 29 at the rear of its lower side. The cable connection portion 29 is connected to a cable 31 through a cable protector 30.

The connector housing 22 has a cylindrical shape. Its front end surface 22a, as seen from FIGS. 3 and 5, has an inclined-cut shape whose lower side is longer than whose upper side. Inside the connector housing 22, terminal chambers 32, 33 and 34 to be inserted into the terminal chambers 2, 3 and 4 of the power receiving connector A are located. The corresponding charging male terminal (not shown), signal female terminal 35 and grounding female connector 36 are inserted into the terminal chambers 32, 33 and 34, respectively. At the center of the terminal chambers 32 to 34, a pusher 37 corresponding to the above returning spring 6 is protruded. As seen from FIG. 6, the front end of the grounding female terminal 36 and its terminal chamber 34 is formed to protrude more forward than that of the signal female terminal 35 and its terminal chamber 36 (and the charging female terminal and its terminal chamber 32). The lead wires 31a, 31b and 31c of the cable 31 connected to the respective female terminals, over which water-proofing stoppers 38 are fit to make individual water-proofing sealing for the respective terminal chambers, are arranged and secured within a main cable path 55 (described later) of the case body 23.

The rear half of the inner face of the connector housing 22 is fit with a water-proofing packing 39 having a uniform width and the front half thereof is fit with a packing holder 40 made of metal such as iron and stainless steel. The packing holder may be made of reinforcement plastic having a large shock withstanding property. The packing holder 40, in accordance with the above inclined front surface 22a of the connector housing 22, is formed to have a width gradually increasing from its top to its bottom. A ring-shaped convex portion 40a formed on the outer peripheral surface is fit to cover the front end surface of the housing 22 to protect and reinforce the tip of the connector housing 22. On the other hand, on the outer surface of the connector housing 22, a guiding protruding strip 41 corresponding to the guide groove 21 is formed on the lower side.

In the case body 23 of the connector housing 22, the upper lock lever chamber 27 is composed of a front chamber 27a and a rear chamber 27b. The illumination chamber 28 formed on the top of the chamber 27 is equipped with a two-color indicator lamp 53 of LED as described later.

A locking lever 44 is rotatably supported by a shaft 43 at a central position inside the locking lever chamber 27. The locking lever 44 is made of metal such as aluminum, iron, stainless steel, etc. like the packing holder 40, and includes an acting arm 45 at the front and an operating arm 46. The front end of the acting arm 45 protrudes from the front chamber 27a and is located in proximity to the outer wall of the connector housing 22. Inside the front end (i.e., on the side of the connector housing 22), a securing piece 45b is formed via a concave portion 45a. The rear end of the operating arm 46 is extended to a window 47 opened into the upper side of the grip 26 and a pressing portion 46a equipped with an embossing is exposed. From the one end of the lower surface 46b of the pressing portion 46a, a pressing piece 48 extending to a path 54 of the grip 26 is protruded, and its lower end is in proximity to or contact with a switch spring 50 of a microswitch 49. The other end of the lower surface 46b is urged upwards by a coil spring 51 of a spring chamber 51 so that the acting arm 45 is always urged downward (toward the connector housing 22).

On the lower side of the case body 23, the pair of division type cases 23a and 23b form a main cable path 55 for the plural lead wires 31a, 31b, . . . constituting the cable 31 so as to communicate with the cable connection portion 29. From the main cable path 55, a wire holding shaft 56 is protruded in proximity to the rear end opening of the terminal chamber 34 into which the grounding terminal 36 is inserted. The wire holding shaft 56 holds the lead wire 31c having the largest diameter connected to the grounding female terminal 36 at the center portion in the vicinity of the terminal chamber 34 so that the water proofing stopper 38 is not inclined to prevent the water proofing characteristic from being lowered.

The lead wire 31c as well as the lead wires 31a and 31b is tape-wound and secured by two wire securing shafts 57 and 57' for tension reduction provided between the wire holding shaft 56 and cable connecting portion 29. Namely, the wire securing shafts 57 and 57' are protruded toward the center of the path in opposite directions with a required interval from each other. The lead wires such as the lead wire 31a tape-wound are pressed by the wire securing shafts 57 and 57' in opposite directions indicated by arrows Q and Q' and hence fixed in its curved state within the main cable path 55. This prevents or relaxes direct application of tension from the outside.

These lead wires are externally extracted, together with the lead wire 31d of the above microswitch 49, through a cable protector 30 fit in the cable connection portion 29. The cable protector 30 has a grommet 58 composed of a flange 58a and a tapered tube 58b successive thereto. The grommet 58 is fit in the cable connection portion 29 in such a manner that a C-shaped stopper ring 59 is fit over a terminal sheath 31e of the cable 31 extending from the flange 58a and the tapered tube 58b is conformed to the tapered portion 29a formed at the end of the main cable path 55, i.e. opening end of the cable connection portion 29. For this reason, even when the cable 31 is pulled in a direction of arrow R, taper tube 58b is tightened by the taper portion 29a so that loosing or coming-off of the cable 31 does not occur.

Figure 8A:
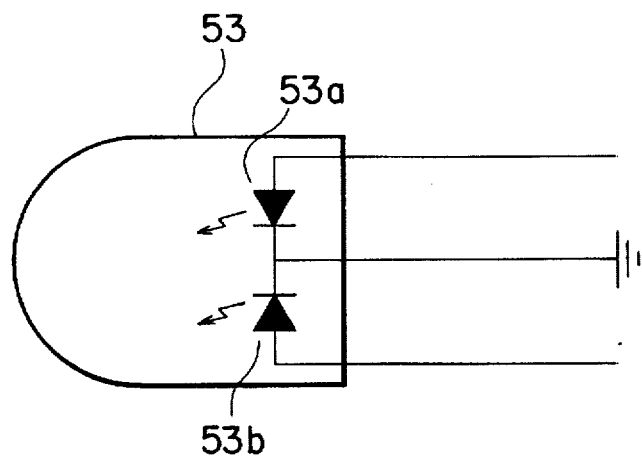
FIGS. 8A and 8B are circuit diagrams of an illumination circuit including an indicator lamp of FIG. 6.

Thus, because of fixing/tightening force of the grommet of the cable protector 30 fit in the cable connection portion 29 and the pressing/friction force in opposite directions by the wire securing shafts 57 and 57', external tension is not entirely or almost applied to the lead wires 31a, 31b, . . . of the cable 31 so that loosing or coming-off of the cable 31 is prevented. On the other hand, a clear case 28a is fit in the illumination chamber 28 at the upper side of the case body 23, and an indicator lamp 53 is set inside the clear case 28a. The indicator lamp 53 may be a two-color type LED device composed of two light-emitting diodes 53a and 53b as shown in FIG. 8A. This LED is configured so that in stand-by, i.e., when the cable 31 is connected to a charger C (FIG. 8B), the one LED 53a emits green, and in charging the other LED 53b emits red.

The micro-switch 49 to be engaged with the pressing piece 48 of the locking lever 44 is connected to a control circuit (safety pilot circuit) 62 equipped with a switch 60 and relay 61 in the charger C. In operation, when the power receiving connector A and the power supply connector B are completely coupled with each other, the switch 60 turns on so that the relay operates. As a result, a current flows through the power supply circuit 63 (male and female terminals and lead wires 10a and 31a).

An explanation will be given of a method of using the power supply connector B.

Figure 8B:
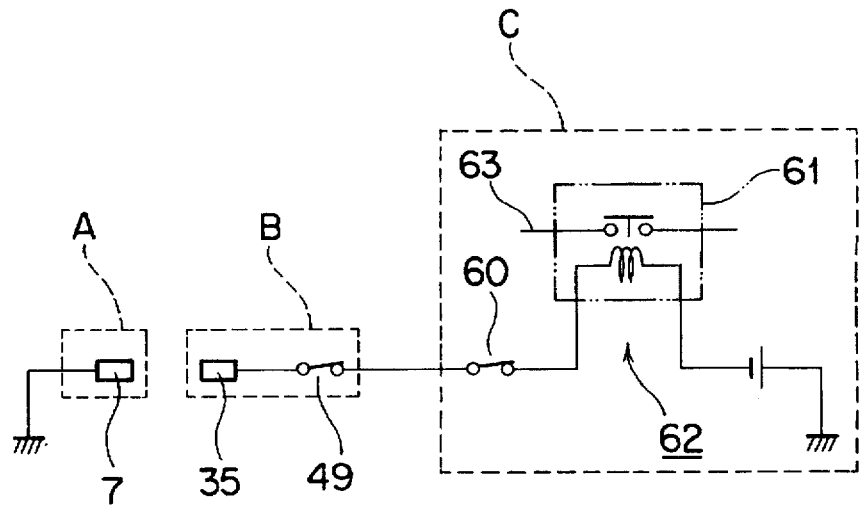

When the cable 31 is connected to the charger C in FIG. 8B, the illumination circuit in FIG. 8A causes the green light emitting diode 53a of the indicator lamp 53 in the illumination chamber 28 to emit light. Thus, since the front surface and upper surface of the power supply connector B is illuminated with light, coupling of the connectors can be made in safety without missing a mark in the dark or night.

In carrying the power supply connector B for coupling, it may slip from a hook or hand and hits on a floor and ground. But, in such a case, since the front of the connector housing 22 is protected by the metallic packing holder 40, the entire power supply connector inclusive of the case body 23 will not be injured.

Next, the power supply connector B will be coupled with the power receiving connector A.

Since the front of the connector housing 22 (front 40b of the packing holder 40) in the connector B is cut aslant, with the grip 26 grasped by hand, its tip can be easily inserted into the gap between the outer housing 1b and inner housing 1a of the power receiving connector A. With the guiding strip 41 on the lower side in FIG. 1 aligned with the guide groove 21 of the connector A (FIG. 1), coupling of the connectors can be made smoothly.

Figure 9:
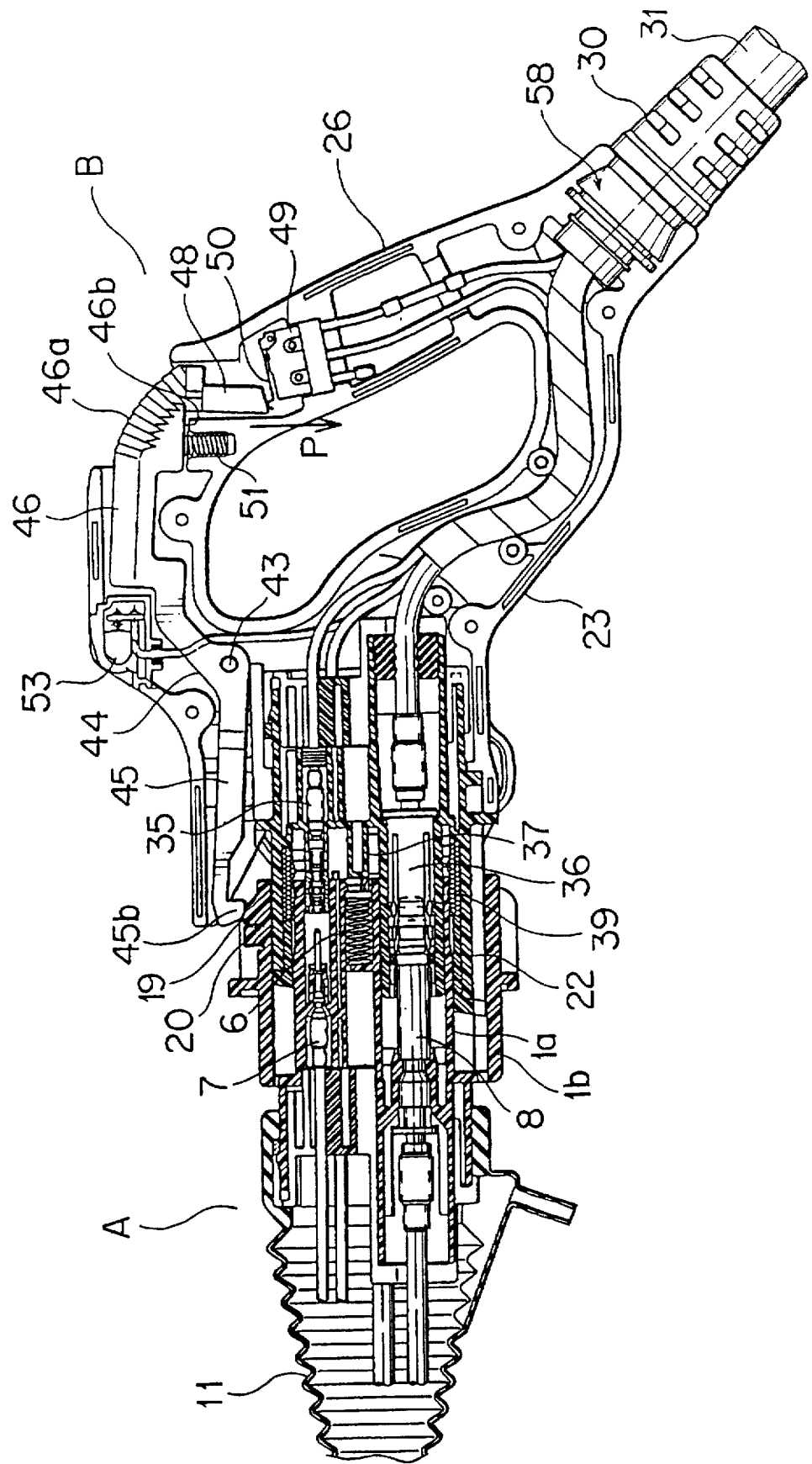
FIG. 9 is a sectional view of the interim state of coupling the power supply connector and the receiving connector in FIG. 1.

FIG. 9 shows the interim state of coupling of the connectors A and B. In the interim coupling, the tip of the inner housing 1a of the power receiving connector A reaches the middle of the ring-shaped water-proof packing 39 in the power supply connector B. The returning spring 6 and pusher 37 are not yet brought into contact with each other. Therefore, the power supply connector B can be smoothly inserted into the power receiving connector A with very slight resistance. First, the grounding terminal 8 and the female terminal 36 are brought into contact with each other. Thus, the entire charging circuit is grounded so that an electric shock of a worker and damage due to short-circuiting of the both connectors A and B can be prevented from happening.

At the same time as the above grounding, the securing piece 45b at the front end of the front acting arm 45 of the locking lever 44 runs onto the front slope of the securing protrusion 19 of the power receiving connector A. Thus, the rear operating arm 46 is pressed down against the coil spring 51 as indicated in arrow P so that the pressing piece 48 presses down the switch spring 50 of the microswitch 49. Then, the microswitch 49 turns "off". Even when the switch 60 of the charger C in the control circuit 62 in FIG. 8B is "on", the contact of the relay 61 is opened so that no current flows through the charging circuit 63.

Figure 10:
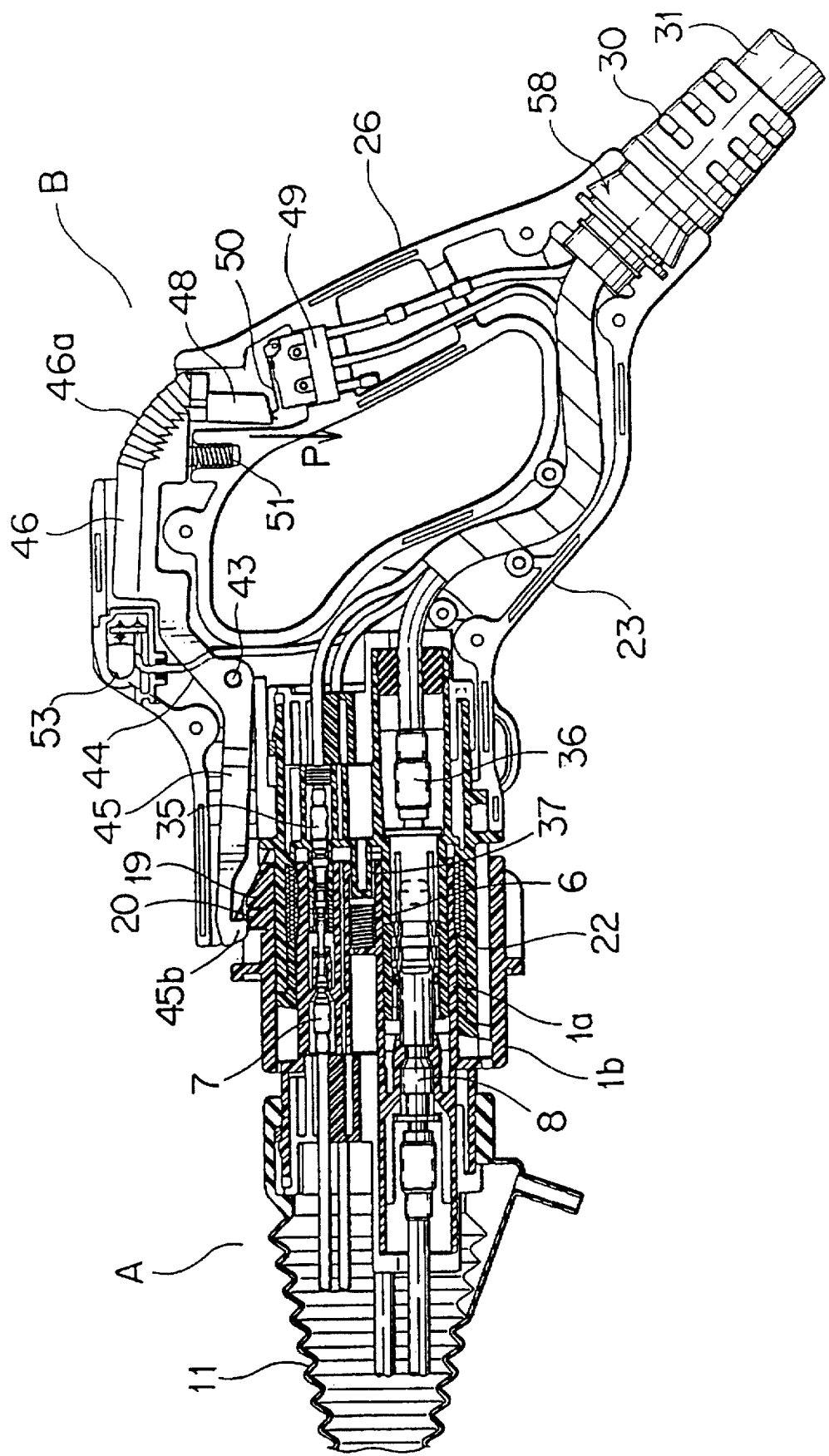
FIG. 10 is a sectional view of the interim state successive to the state of FIG. 9.

FIG. 10 shows the interim coupling state at the next stage. When the power supply connector B is further inserted, the pusher 37 hits on the returning spring 6. Therefore, coupling of the power supply connector B with the connector A is carried out against the elastic force. As seen from FIG. 10, since the connection between the signal male terminal 7 and the signal female terminal 35 and the connection between the charging male terminal and charging female terminal are also started, the force required for coupling is increased. Since the securing piece 45b of the locking lever 44 is still on the rear of the securing protrusion, the microswitch 49 is still "off", and hence no current flow through the charging circuit. When a worker detaches his hand from the connector B to stop the coupling operation in the state of FIG. 10, the connector B can be easily removed by the spring-back operation of the returning spring 6. By increasing the elasticity of the returning spring, the connector B can be returned to the semi-coupling state by its spring-back operation.

Figure 11:
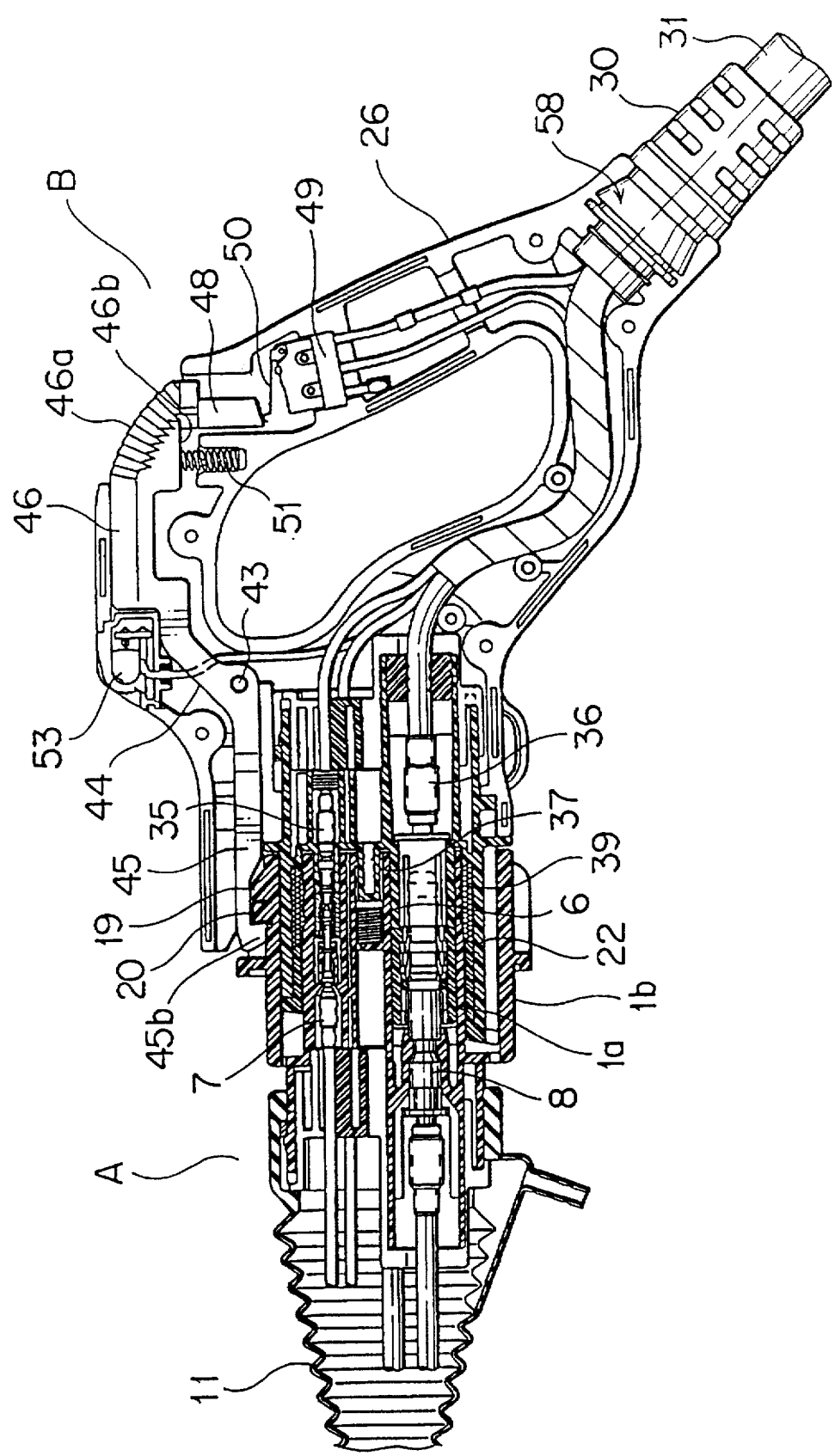
FIG. 11 is a sectional view of the state of completion of the coupling.
Figure 12:
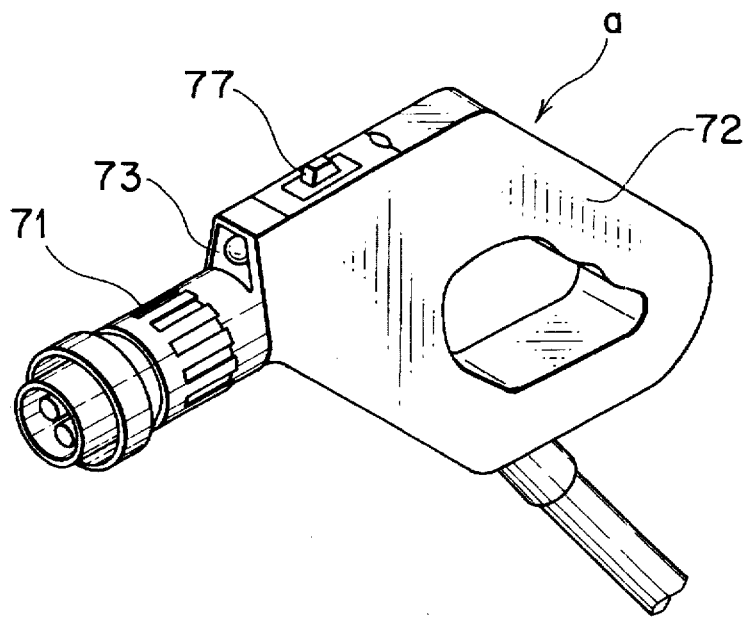
FIG. 12 is a perspective view of a conventional power supply connector.
Figure 13:
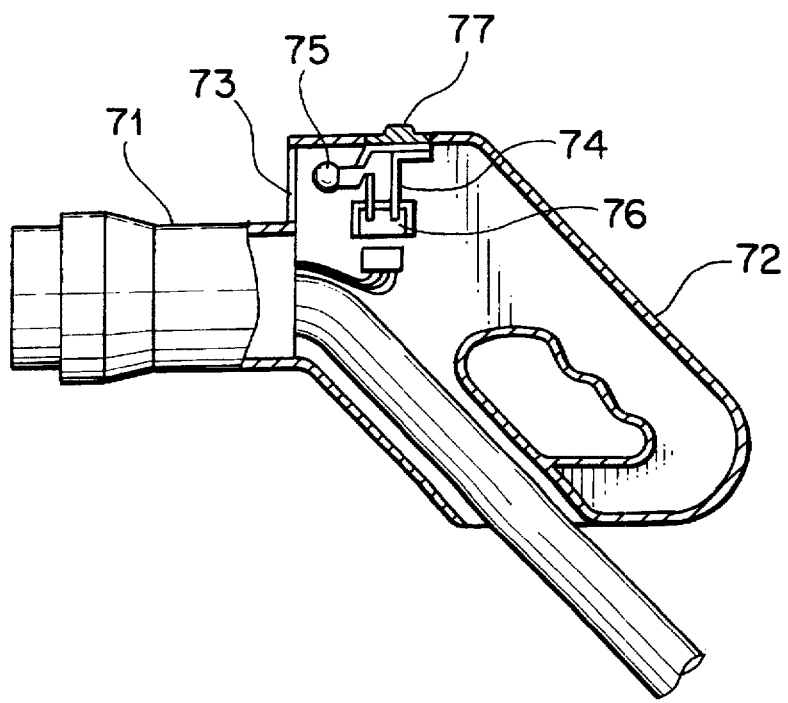
FIG. 13 is a longitudinal sectional view of an illumination portion of the power supply connector of FIG. 12.
Figure 14:
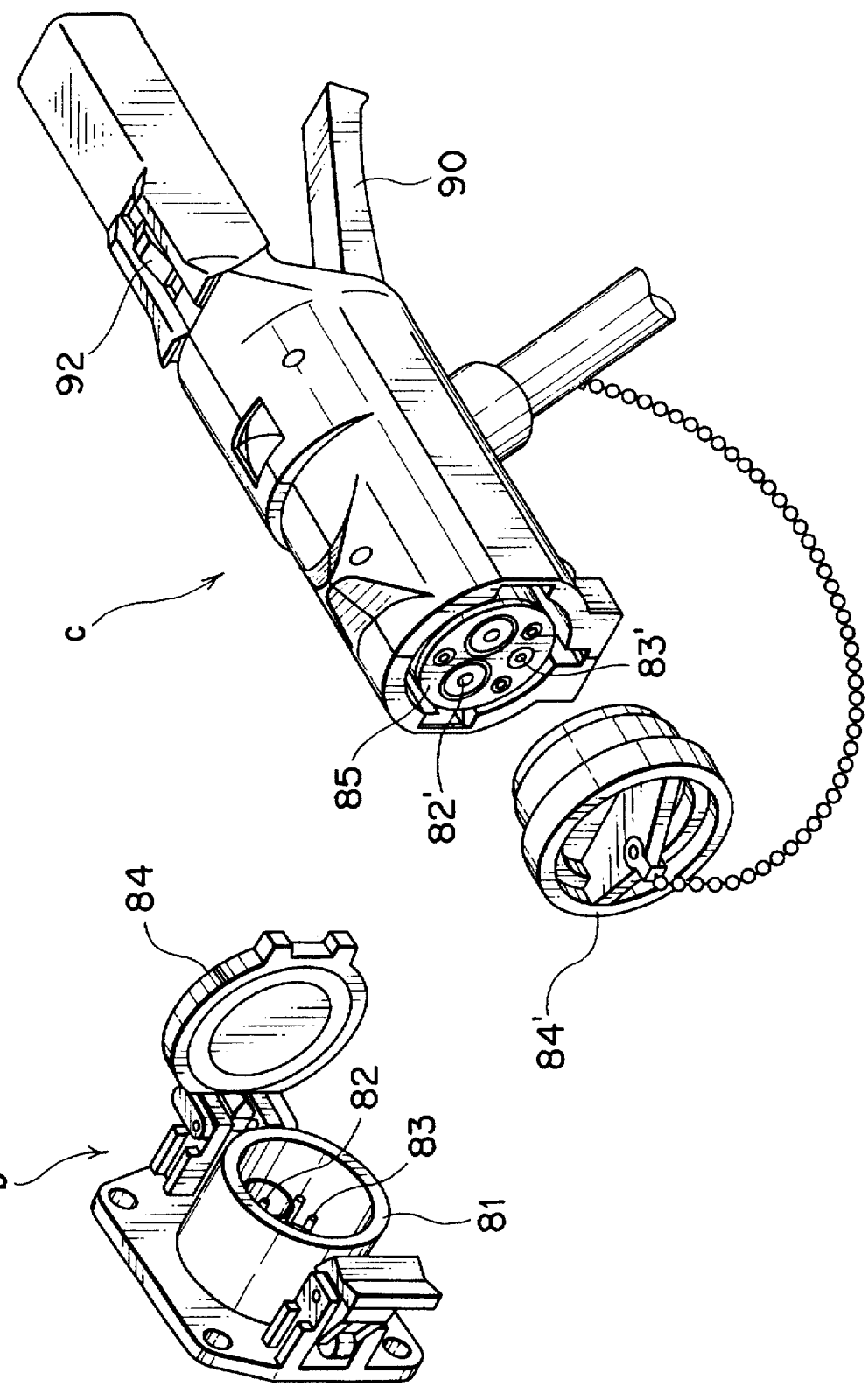
FIG. 14 is a perspective view showing the separating state of power supply connector and a power receiving connector in another conventional charging connector device.
Figure 15:
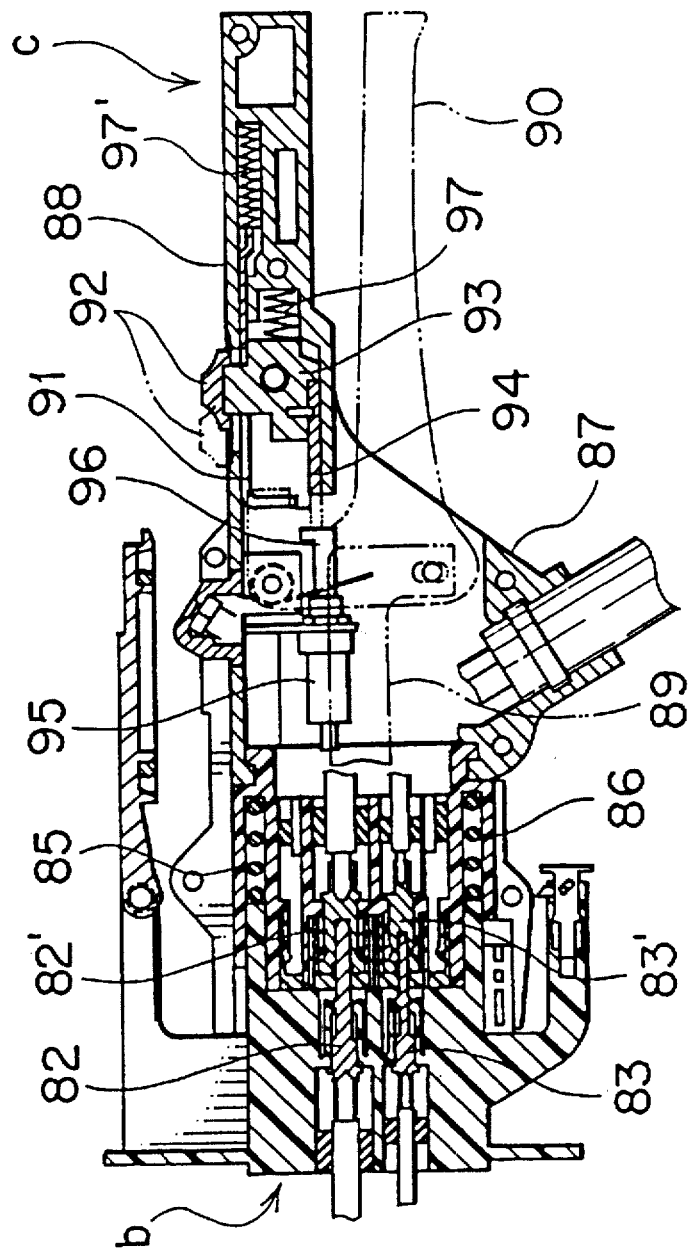
FIG. 15 is a longitudinal sectional view of the complete coupling state of the connector device in FIG. 14.
Figure 16:
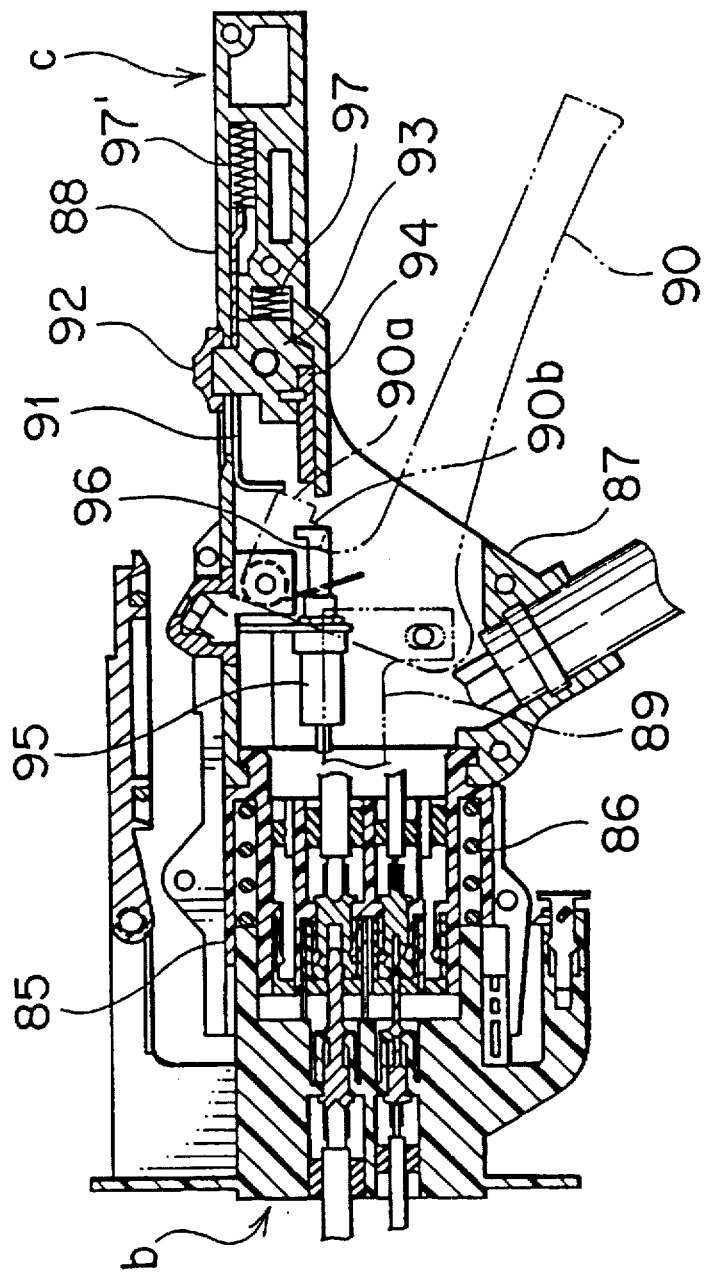
FIG. 16 is a longitudinal sectional view of the state where a sliding switch is moved from a complete coupling position to a return position.

FIG. 11 shows the complete coupling state of the connectors A and B. In the state of FIG. 10, when the connector B is pushed into the connector A against the elastic force of the returning spring 6, both connectors are completely coupled with each other.

Specifically, the securing piece 45b runs over the securing protrusion 19, the locking lever 44 is returned elastically by the coil spring 51. Thus, the securing piece 45b is engaged with the rear face of the securing protrusion 19. Simultaneously, the male and female terminals for charging, the male and female terminals 35 and 7 for signal and the male and female terminals for grounding 36 and 8 are completely connected to each other. The elastic return of the locking lever 44 releases the pressing-down of the switch spring 50 by the pressing piece 48 so that the microswitch 49 turns "on". Thus, in the control circuit 62 in FIG. 8B, the contact of the relay 61 is closed so that the charging circuit 63 turns on electricity, thus starting charging. As described above, only when the power receiving connector A and the power supply connector B falls in a complete coupling state as shown in FIG. 11, the control circuit 62, i.e., the safety pilot circuit turns "on", thus allowing charging. In the interim coupling state in FIG. 9 or 10, the control circuit 62 is "off" like before coupling so that the charging will not be carried out in an unstable state.

Further, removal (release of coupling) of both connectors A and B can be made very easily. Specifically, after completion of charging, when the pressing portion 46a of the operating arm 46 exposed from the window of the grip 26 is pushed down by e.g., the thumb, the forward acting arm 44 can be easily lifted by leverage on the supporting point of the shaft 43 so that the engagement of the securing piece 45 and the securing protrusion 9 is released. Thus, pushing-back force by the returning spring 6 is applied to the connector B through the pusher 37 so that the connector B can be easily separated from the connector A by small force. During the separation process, the microswitch 49 is in an "off" state as in the interim coupling so that the charging circuit 63 does not turn on electricity.

What is claimed is:

1. A charging connector device for an electric vehicle comprising a power supplying connector and a power receiving connector, said power supplying connector comprising a single indicator lamp set in an illumination chamber which is disposed on said power supplying connector, said indicator lamp including two LEDs which emit two different colors such that a first LED emits one color during standby when said power supplying connector is connected to a charger and a second LED emits another color during charging, respectively, wherein said power supplying connector further comprises:

a microswitch having a contact with a switch spring so as to allow energization of the connector device;

a locking lever having a securing piece at its first end and a pressing portion at its second end opposite to said first end, and an intermediate portion between said first end and said second end being axially supported, said pressing portion being engageable with said switch spring of said microswitch; and said power receiving connector including a securing protrusion being engageable with said securing piece when both connectors are completely coupled with each other, wherein when said power supplying connector and said power receiving connector are completely coupled with each other, said charging connector device is energized.

2. A charging connector device according to claim 1, wherein said power supply connector further comprises means for urging said locking lever for locking and releasing engagement between said pressing portion of said locking lever and said switch spring of said microswitch.

3. A charging connector device for an electric vehicle comprising a power supplying connector and a power receiving connector, said power supplying connector comprising:

a microswitch having a contact with a switch spring so as to allow energization of said charging connector device;

a locking lever having a securing piece at its first end and a pressing portion at its second end opposite to said first end, and an intermediate portion between said first end and said second end being axially supported, said pressing portion being engageable with said switch spring of said microswitch; and said power receiving connector including a securing protrusion engaged with said securing piece when both connectors are completely coupled with each other, wherein when said power supplying connector and said power receiving connector are completely coupled with each other, said charging connector device is energized.

4. A charging connector device according to claim 3, further comprising means for urging said locking lever for locking and releasing engagement between said pressing portion of said locking lever and said switch spring of said microswitch.

5. A charging connector device for an electric vehicle comprising a power supplying connector and a power receiving connector, said power supplying connector comprising:

a microswitch having a contact with a switch spring so as to allow the turn-on of electricity;

a locking lever having a securing piece at its first end and a pressing portion at its second end opposite to said first end, and an intermediate portion between said first end and said second end being axially supported, said pressing portion being engageable with said switch spring of said microswitch; and said power receiving connector including a securing protrusion engaged with said securing piece when both connectors are completely coupled with each other; and means for urging said locking lever for locking and releasing engagement between said pressing portion of said locking lever and said switch spring of the microswitch, wherein when said power supplying connector and said power receiving connector are completely coupled with each other, said charging connector device is energized.

* * * * *